United States Patent
Perets et al.

(10) Patent No.: US 9,036,746 B2
(45) Date of Patent: May 19, 2015

(54) ESTIMATING DOPPLER SHIFT USING PREDEFINED AUTOCORRELATION VECTORS

(71) Applicant: Marvell World Trade Ltd., St. Michael (BB)

(72) Inventors: Yona Perets, Ra'anana (IL); Daniel Yellin, Ra'anana (IL); Kobby Pick, Beit Zait (IL); Ronen Mayrench, Ra'anana (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/481,931

(22) Filed: Sep. 10, 2014

(65) Prior Publication Data

US 2015/0071388 A1 Mar. 12, 2015

Related U.S. Application Data

(60) Provisional application No. 61/876,035, filed on Sep. 10, 2013.

(51) Int. Cl.
*H03D 1/00* (2006.01)
*H04B 1/12* (2006.01)
*H04L 5/00* (2006.01)

(52) U.S. Cl.
CPC ............... *H04B 1/12* (2013.01); *H04L 5/0007* (2013.01)

(58) Field of Classification Search
USPC ........................................................ 375/343
See application file for complete search history.

(56) References Cited

U.S. PATENT DOCUMENTS

| 6,542,745 | B1* | 4/2003 | Mottier et al. ................. | 455/441 |
| 2004/0220474 | A1* | 11/2004 | Abend et al. ................... | 600/437 |
| 2005/0033174 | A1* | 2/2005 | Moehring et al. ............. | 600/453 |
| 2007/0247936 | A1* | 10/2007 | Direnzo et al. ................ | 365/200 |
| 2009/0252263 | A1* | 10/2009 | Liu et al. ........................ | 375/344 |
| 2010/0128823 | A1 | 5/2010 | Sasaoka et al. | |
| 2011/0026649 | A1 | 2/2011 | Lipka et al. | |

OTHER PUBLICATIONS

3GPP TS 36.101, "3rd Generation Partnership Project;Technical Specification Group Radio Access Network; Evolved Universal Terrestrial Radio Access (E-UTRA);User Equipment (UE) radio transmission and reception" Release 12, version 12.3.0, 510 pages, Mar. 2014.

3GPP TS 36.211, "3rd Generation Partnership Project;Technical Specification Group Radio Access Network; Evolved Universal Terrestrial Radio Access (E-UTRA);Physical channels and modulation", Release 12, version 12.2.0, 121 pages, Jun. 2014.

(Continued)

*Primary Examiner* — Erin File (57) ABSTRACT

A method includes holding in a memory of a communication terminal multiple predefined vectors, each including signal autocorrelation values computed for a respective Doppler shift. A signal is received, and empirical autocorrelation values are calculated for the received signal. An actual Doppler shift of the received signal is estimated by selecting, from among the predefined vectors, a vector whose autocorrelation values best match the empirical autocorrelation values of the received signal.

20 Claims, 3 Drawing Sheets (56) References Cited

OTHER PUBLICATIONS

European Application # 14003695.5 Search Report dated Mar. 19, 2015.

Mason et al., "Detection Synchronization, and Doppler Scale Estimation with Multicarrier Waveforms in Underwater Acoustic Communication", IEEE Journal on Selected Areas in Communications, IEEE Service Center, vol. 25, No. 9, pp. 1638-1649, Dec. 1, 2008.

* cited by examiner

ESTIMATING DOPPLER SHIFT USING PREDEFINED AUTOCORRELATION VECTORS

CROSS-REFERENCE TO RELATED APPLICATIONS

This application claims the benefit of U.S. Provisional Patent Application 61/876,035, filed Sep. 10, 2013, whose disclosure is incorporated herein by reference.

FIELD OF THE DISCLOSURE

The present disclosure relates generally to communication systems, and particularly to methods and systems for estimating Doppler shift in a received signal.

BACKGROUND

Various communication systems are designed to accommodate certain levels of signal distortion created by the communication channel. For example, the Doppler effect distortion causes a change in frequency of a signal received at a receiver that is moving relative to the transmitting source. Design considerations for the Evolved Universal Terrestrial Radio Access (E-UTRA) systems, also referred to as Long Term Evolution (LTE) systems, including various measurement channels incorporating the Doppler effect, are described, for example, in Annex A of 3GPP Technical Specification TS 36.101 entitled "3rd Generation Partnership Project; Technical Specification Group Radio Access Network; Evolved Universal Terrestrial Radio Access (E-UTRA); User Equipment (UE) radio transmission and reception (Release 12)," (3GPP TS 36.101), version 12.3.0, March, 2014, which is incorporated herein by reference.

The description above is presented as a general overview of related art in this field and should not be construed as an admission that any of the information it contains constitutes prior art against the present patent application.

SUMMARY

An embodiment that is described herein provides a method including holding in a memory of a communication terminal multiple predefined vectors, each including signal autocorrelation values computed for a respective Doppler shift. A signal is received, and empirical autocorrelation values are calculated for the received signal. An actual Doppler shift of the received signal is estimated by selecting, from among the predefined vectors, a vector whose autocorrelation values best match the empirical autocorrelation values of the received signal.

In some embodiments, receiving the signal includes receiving an Orthogonal Frequency-Division Multiplexing (OFDM) signal that is transmitted in multiple time-frequency bins, and calculating the empirical autocorrelation values includes deriving frequency averages of the received signal, each frequency average computed over time-frequency bins of a respective time index, and calculating the empirical autocorrelation values using the frequency averages. In other embodiments, the time-frequency bins span a given frequency band, deriving the frequency averages includes dividing the frequency band into two or more frequency sub-bands and calculating the frequency averages separately for each of the frequency sub-bands, and estimating the Doppler shift includes selecting the vector based on the frequency averages calculated over the frequency sub-bands.

In an embodiment, calculating the empirical autocorrelation values includes normalizing the empirical autocorrelation values by a factor that corresponds to an empirical autocorrelation value of a non-zero time lag. In another embodiment, calculating the empirical autocorrelation values includes calculating the empirical autocorrelation values over multiple different time segments corresponding to Orthogonal Frequency-Division Multiplexing (OFDM) symbols that the received signal bears, and smoothing the empirical autocorrelation values, per time lag, over the multiple time segments.

In some embodiments, smoothing the empirical autocorrelation values includes filtering the empirical autocorrelation values of a given time lag using a first-order low-pass Infinite Impulse Response (IIR) filter. In other embodiments, filtering the empirical autocorrelation values includes specifying the IIR filter with a forgetting coefficient that depends on a continuous or Discontinuous Reception (DRX) mode of the communication terminal, and on the given time lag.

In an embodiment, calculating the empirical autocorrelation values includes rotating the empirical autocorrelation values based on a frequency correction indication from an Automatic Frequency Control (AFC) loop of the communication terminal. In another embodiment, each of the predefined vectors includes multiple samples of an autocorrelation function, according to a Jakes' fading model. In yet another embodiment, selecting the vector includes choosing the vector whose autocorrelation values minimize a similarity metric with respect to the empirical autocorrelation values of the received signal. In yet another embodiment, the similarity metric includes a mean squares difference metric.

In some embodiments, selecting the vector includes calculating similarity metrics between the predefined vectors and the empirical autocorrelation values of the received signal, while excluding at least zero-time-lag autocorrelation values. In other embodiments, estimating the actual Doppler shift includes using a first number of the predefined vectors when operating in a Time-Division Duplex (TDD) mode, and a second number of the predefined vectors, larger than the first number, when operating in a Frequency-Division Duplex (FDD) mode.

There is additionally provided, in accordance with an embodiment that is described herein, apparatus including a receiver, which is configured to receive a signal, and processing circuitry. The processing circuitry is configured to hold in a memory multiple predefined vectors, each including signal autocorrelation values computed for a respective Doppler shift, to calculate empirical autocorrelation values for the received signal, and to estimate an actual Doppler shift of the received signal by selecting, from among the predefined vectors, a vector whose autocorrelation values best match the empirical autocorrelation values of the received signal.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and devices for estimating a Doppler shift in mobile communication terminals. A Doppler shift in a received signal is typically created when the receiver is moving relative to the transmitter. The amplitude or value of the Doppler shift is proportional to the relative movement velocity. The Doppler shift value may be positive or negative depending on whether the receiver moves towards or away from the transmitter.

In the disclosed techniques, Doppler shift estimation is based on matching empirical autocorrelation vectors of the received signal to multiple reference autocorrelation vectors corresponding to different Doppler shift values.

In an embodiment, a communication terminal holds in a memory multiple predefined vectors, each comprising signal autocorrelation values computed for a respective Doppler shift. In the present example, the mobile terminal comprises a UE operating in a LTE communication system. The UE comprises processing circuitry, which receives a baseband signal that is possibly affected by Doppler shift, and calculates empirical autocorrelation values for the received signal. The processing circuitry estimates the actual Doppler shift of the received signal by selecting, from among the predefined vectors, a vector whose autocorrelation values best match the empirical autocorrelation values of the received signal.

In some embodiments, the received baseband signal comprises an Orthogonal Frequency-Division Multiplexing (OFDM) signal that is transmitted in multiple time-frequency bins. The processing circuitry derives one or more frequency averages (also referred to herein as anchor signals) of the received signal, each frequency average is computed over time-frequency bins of a respective time index. The processing circuitry then calculates the empirical autocorrelation values using the anchor signals as will be described below. The anchor signals typically comprise complex numerical values having respective amplitudes and phases.

In some embodiments, the OFDM time-frequency bins span a given frequency band within the available channel bandwidth. The processing circuitry divides the frequency band into two or more frequency sub-bands, and calculates the frequency averages separately for each of the frequency sub-bands.

In an embodiment the processing circuitry normalizes the empirical autocorrelation values by a factor that corresponds to the empirical autocorrelation value of the second time lag. The processing circuitry applies smoothing filtering to the normalized autocorrelation values using a low-pass Infinite Impulse Response (IIR) filter. The IIR filter comprises a forgetting coefficient whose setting depends on a continuous or Discontinuous Reception (DRX) mode of operation, and on the given time lag.

In some embodiments, when operating in DRX mode, an Automatic Frequency Control (AFC) process or loop provides a frequency correction indication at the beginning of a DRX wake-up interval. The processing circuitry compensates for the frequency correction applied by the AFC process by rotating (i.e., change the phase of the numerical complex values of) the anchor signals accordingly. The processing circuitry applies time-dependent or fixed rotation depending on whether the time lags precede the event indicating the AFC frequency correction.

The predefined vectors are typically determined offline, e.g., in accordance with a respective channel model, or empirically. In an embodiment, each of the predefined vectors comprises multiple samples of an autocorrelation function, according to the Jakes' fading model.

In some embodiments, to estimate the actual Doppler vector, the processing circuitry chooses one of the predefined vectors whose autocorrelation values minimize some similarity metric with respect to the empirical autocorrelation values of the received signal. The processing circuitry may evaluate any suitable similarity metric, such as, for example, the mean square difference metric. In some embodiments, the number of predefined vectors depends on the underlying operating mode (TDD or FDD). For example, in an embodiment, when operating in TDD mode the number of predefined vectors is larger than when operating in FDD mode.

The Doppler shift value estimated by the disclosed techniques is used, for example, for improving the reliability of data decoding from the received baseband signal.

Figure 1:
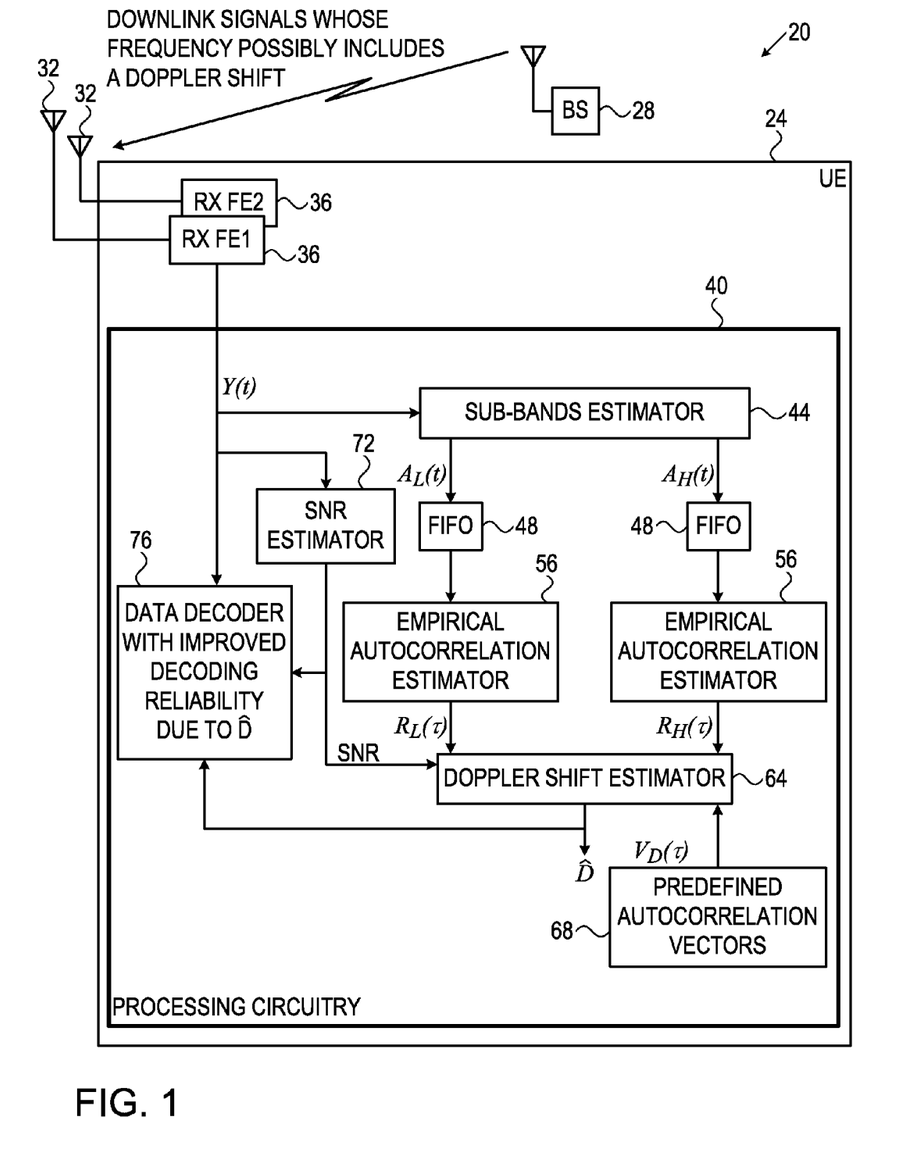
FIG. 1 is a block diagram that schematically illustrates a communication system, in accordance with an embodiment that is described herein.

FIG. 1 is a block diagram that schematically illustrates a communication system 20, in accordance with an embodiment that is described herein. In the present example, system 20 comprises a LTE communication system in which a mobile terminal 24 communicates with a Base Station (BS) 28. In LTE, a mobile terminal is also referred to as an E-UTRA User Equipment (UE) or simply UE for brevity, and a BS is also referred to as an eNodeB.

When communicating with a given BS, among other tasks, the UE receives from the BS downlink signals, which comprise reference signals and data-carrying signals. The data-carrying signals convey user data, signaling and other information from the BS to the UE. The reference signals comprise pilot signals that do not carry data or signaling, and are used for synchronization, channel estimation and other measurements.

In the embodiment of FIG. 1, UE 24 comprises multiple antennas 24 for receiving the downlink RF signal transmitted by the base station. The UE further comprises respective receiver front end units 36 (denoted RX FE1 and RX FE2) and processing circuitry 40. Each front end unit 36 typically receives the downlink RF signal from respective antenna 32, down-converts the signal to baseband and digitizes the baseband signal. Processing circuitry 40 performs the various digital and baseband processing tasks of the terminal. Among other tasks, processing circuitry 40 estimates a Doppler shift in the baseband signal as will be described in detail below.

In LTE, downlink transmission employs an Orthogonal frequency-division multiplexing (OFDMA) transmission scheme, which is a multicarrier technology subdividing the available bandwidth into multiple narrowband subcarriers that are mutually orthogonal. Each OFDM subcarrier is modulated using conventional modulation schemes such as QPSK and 16-QAM, at a suitable symbol rate.

OFDM is described for example in 3GPP Technical Specification TS 36.211 entitled "3rd Generation Partnership Project; Technical Specification Group Radio Access Network; Evolved Universal Terrestrial Radio Access (E-UTRA); Physical channels and modulation (Release 12)," (3GPP TS 36.211)), version 12.2.0, June, 2014, which is incorporated herein by reference.

The OFDM signal can be represented by a matrix comprising multiple time-frequency bins. The time-frequency bins for a given time index refer to a respective OFDM subcarrier. Processing circuitry 40 comprises a sub-bands estimator 44 that averages (or sums) multiple OFDM time-frequency bins, for a given time index, within predefined lower and higher frequency sub-bands of the channel bandwidth, as depicted in Equations 1 and 2.

$$A_{H,RxAnt}(t) = \sum_{j=-N}^{N} Y_{RxAnt}(k_H - j, t) \quad \text{Equation 1}$$

$$A_{L,RxAnt}(t) = \sum_{j=-N}^{N} Y_{RxAnt}(k_L - j, t) \quad \text{Equation 2}$$

In Equations 1 and 2, $RxAnt \in \{1,2\}$ denotes a receiving antenna 32, $k_H$ and $K_L$ denote a middle time-frequency bin of the respective high and low frequency sub-bands, $Y_{RxAnt}(k, t)$ denotes the OFDM time-frequency bin at time index t and frequency index k originating from antenna RxAnt, and $A_{H,RxAnt}(t)$ and $A_{L,RxAnt}(t)$ denote the respective high and low outputs of sub-bands estimator 44 for antenna RxAnt at time index t. The outputs $A_{H,RxAnt}(t)$ and $A_{L,RxAnt}(t)$ are also referred to herein as high-band and low-band anchor signals, respectively.

In Equations 1, and 2 above, an integer N determines the number of time-frequency bins to average. Typically N is selected in the range $1 \leq N \leq 3$, in which case the number of averaged bins (2·N+1) does not exceed seven bins in each of the high and low sub-bands. The index of the middle bin, i.e., $k_H$ and $k_L$, depends on the available bandwidth of the channel, as depicted in Table 1.

TABLE 1 middle bins $k_L$ and $k_H$ for several channel bandwidths

| Channel bandwidth | $k_L$ | $k_H$ |
|---|---|---|
| 1.25 MHz | 3 | 8 |
| 2.5 MHz | 8 | 16 |
| 5 MHz | 8 | 41 |
| 10 MHz | 8 | 91 |
| 15 MHz | 8 | 141 |
| 20 MHz | 8 | 191 |

Processing circuitry 40 stores the anchor signals in First In First Out (FIFO) units 48. One of FIFO units 48 stores the high-band anchor signal $A_{H,RxAnt}(t)$, and the other FIFO unit stores the low-band anchor signal $A_{L,RxAnt}(t)$. In an embodiment, each of FIFO units 48 stores the anchor signals separately per antenna RxAnt.

In the present example, FIFO 48 comprises up to sixty entries corresponding to pilot symbols, which are about 0.25 ms apart from one another. Therefore FIFO can store anchor signals over intervals of 15 ms (60·0.25 ms.) This FIFO configuration enables the processing circuitry to calculate empirical autocorrelation of anchor signals up to a time lag of 15 ms. In alternative embodiments, other FIFO configurations that result in maximal autocorrelation lag other than 15 ms are also possible.

Terminal 24 can be configured to operate in either a Time Division Duplex (TDD) or a Frequency Division Duplex (FDD) mode. In an embodiment, when operating in TDD mode, the processing circuitry zeros entries in FIFO 48 that correspond to intervals in which pilot symbols are not received, for example, during the transmission of uplink (e.g., special) sub-frames. By zeroing entries in FIFO 48 in which pilot symbols are missing, processing circuitry 40 ensures that the FIFO entries corresponding to actual pilot symbols are aligned correctly in time, e.g., for the purpose of autocorrelation calculation.

In some embodiments, UE 24 is configured to operate in a Discontinuous Reception DRX mode (either in FDD or TDD mode), e.g., to conserve the battery of the UE. In DRX mode the network typically negotiates with the UE a scheduling of time intervals in which data transfer occurs (wake-up intervals). During other times the UE typically turns its receiver off and enters a low power operating state. In an embodiment, when the receiver wakes up in accordance with the DRX scheduling, processing circuitry 40 clears FIFO 48 prior to storing new anchor signals, so that calculating autocorrelation vectors includes only anchor signals that belong to the same wake-up interval.

Processing circuitry 40 comprises empirical autocorrelation estimators 56 for calculating high-band and low-band empirical autocorrelation vectors of the anchor signals. The empirical autocorrelation estimators calculate the autocorrelation vectors as depicted in Equations 3 and 4.

$$r_{H,RxAnt}(\tau) = (1-\alpha) \cdot r_{H,RxAnt}(\tau) + \alpha \cdot A_{H,RxAnt}(0) \cdot A_{H,RxAnt}(\tau)^* \quad \text{Equation 3:}$$

$$r_{L,RxAnt}(\tau) = (1-\alpha) \cdot r_{L,RxAnt}(\tau) + \alpha \cdot A_{L,RxAnt}(0) \cdot A_{L,RxAnt}(\tau)^* \quad \text{Equation 4:}$$

In Equations 3 and 4, $r_{H,RxAnt}(\tau)$ and $r_{L,RxAnt}(\tau)$ denote autocorrelation outcome at time lag $\tau$, for antenna RxAnt, for the high and low sub-bands, respectively. In Equation 3, $A_{H,RxAnt}(0)$ and $A_{H,RxAnt}(\tau)^*$ correspond to the high-band anchor signal at lag zero, i.e., the earliest FIFO entry, and to the $\tau^{th}$ FIFO entry. The symbol * denotes the complex conjugate operator. Similar terminology applies to Equation 4.

Equations 3 and 4 implement an Infinite Impulse Response (IIR) filter wherein $0 < \alpha < 1$ denotes the forgetting coefficient of the filter. Considerations for determining the forgetting coefficient value are given further below. Note that if in Equations 3 and 4 above, the anchor signal for some time lag $\tau$ equals zero, the autocorrelation result for that time lag does not change relative to the previous calculation for the same time lag. In some embodiments, the value of the forgetting coefficient used during DRX wake-up intervals depends on the ratio between the DRX wake-up and off intervals. For example, the forgetting coefficient can be adjusted to achieve fast updating of the Doppler estimation during wake-up periods.

In some embodiments, wake-up intervals that are used for measurements related to BSs other than the serving BS of the UE can also be used for Doppler shift estimation using the disclosed techniques.

In some embodiments, empirical autocorrelation estimator 56 calculates the autocorrelation outcomes for a selected set of time lags $\tau$. For example, autocorrelation estimator 56 typically does not produce an output for time lag $\tau=0$, since the zero lag autocorrelation comprises mostly noise information. As another example, autocorrelation estimator 56 typically produces an output for time lag $\tau=1$ to be used for normalizing the autocorrelation vector, as will be described below.

Let $\Omega = \{\tau_1 \ldots \tau_M\}$ denote a predefined set of M time lags for which autocorrelation estimator 56 produces an output in accordance with Equations 3 and 4 above. In other words, autocorrelation estimator 56 produces a vector of M autocorrelation values for the time lags $\tau \in \Omega$. Autocorrelation estimator 56 further normalizes the autocorrelation vector by dividing the vector elements by the autocorrelation result for $\tau_1=1$ as depicted in Equations 5 and 6.

$$R_{H,RxAnt}(\tau) = \frac{r_{H,RxAnt}(\tau)}{r_{H,RxAnt}(\tau_1)}, \tau = \tau_1 \ldots \tau_M \quad \text{Equation 5}$$

$$R_{L,RxAnt}(\tau) = \frac{r_{L,RxAnt}(\tau)}{r_{L,RxAnt}(\tau_1)}, \tau = \tau_1 \ldots \tau_M \quad \text{Equation 6}$$

In Equations 5 and 6 $R_{H,RxAnt}(\tau)$ and $R_{L,RxAnt}(\tau)$ denote the high-band and low-band normalized autocorrelation vectors, respectively. Note that in Equation 5 and 6 $R_{H,RxAnt}(\tau_1) = R_{L,RxAnt}(\tau_1) = 1$.

In an embodiment, autocorrelation estimator 56 normalizes the autocorrelation vectors of Equations 3 and 4 above (e.g., using Equations 5 and 6) only when actually estimating the Doppler shift as will be described further below.

Processing circuitry 40 comprises a Doppler shift estimator 64, which receives as inputs the normalized autocorrelation vectors $R_{H,RxAnt}(\tau)$, and $R_{L,RxAnt}(\tau)$ from autocorrelation estimators 56. Processor circuitry 40 additionally comprises a set of N predefined vectors $V_D(\tau)$ 68, corresponding to N Doppler shift values denoted D1 ... DN. The number N of predefined vectors may depend for example on the operating mode of the UE. For example, in an embodiment, N is larger when operating in a Time-Division Duplex (TDD) mode than when operating in a Frequency-Division Duplex (FDD) mode.

Each of the vectors $V_D(\tau)$ comprises M−1 elements that represent autocorrelation values for the time lags $\tau_2 \ldots \tau_M \in \Omega$. In some embodiments, predefined autocorrelation vectors 68 are determined offline using any suitable method. In some embodiments predefined autocorrelation vectors 68 are determined using a mathematical model, such as for example, the Jakes' model, as will be described in FIG. 2 further below. In other embodiments, autocorrelation vectors 68 are determined using any other mathematical models, or empirically.

Doppler shift estimator 64 calculates a metric M(D) that measures the similarity between the normalized autocorrelation vectors $R_{H,RxAnt}(\tau)$ and $R_{L,RxAnt}(\tau)$ and each of the vectors $V_D(\tau)$. In one embodiment, the metric M(D) comprises a mean squares difference metric as given in Equation 7.

$$M(D) = \sum_{RxAnt} \sum_{\tau=\tau_2}^{\tau_M} (|R_{H,RxAnt}(\tau) - V_D(\tau)|^2 + |R_{L,RxAnt}(\tau) - V_D(\tau)|^2) \quad \text{Equation 7}$$

In an example embodiment, M(D) comprises a weighted mean squares difference metric, as depicted in Equation 8 below, wherein the weights correspond to SNR values $\gamma_{RxAnt}$ estimated by a SNR estimator 72, per antenna 32.

$$M(D) = \sum_{RxAnt} \sum_{\tau=\tau_2}^{\tau_M} \gamma_{RxAnt} \cdot (|R_{H,RxAnt}(\tau) - V_D(\tau)|^2 + |R_{L,RxAnt}(\tau) - V_D(\tau)|^2) \quad \text{Equation 8}$$

In yet other embodiments, any other suitable metric can also be used. Note that in Equations 7 and 8, the calculation of M(D) is based on time lags $\tau_2 \ldots \tau_M$, excluding $\tau_1$ for which the normalized empirical autocorrelation equals a constant value of unity and therefore bears no discrimination information.

As described above, Doppler shift estimator 64 calculates the metric M(D) for N predefined shift values D1 ... DN. To estimate the actual Doppler shift $\hat{D}$, Doppler shift estimator selects the Doppler shift value among D1 ... DN, for which M(D) is minimal, as given in Equation 9.

$$\hat{D} = \text{Argmin}_D\{M(D1) \ldots M(DN)\} \quad \text{Equation 9:}$$

In some embodiments, using predefined autocorrelation vectors 68 result in under-estimation or over-estimation relative to the actual Doppler shift. In other words, the estimated Doppler shift may be consistently lower or higher than the actual Doppler shift. In such embodiments, predefined autocorrelation vectors 68 are biased or otherwise adjusted so as to correct the estimation, e.g., prior to storing in predefined autocorrelation vectors 68.

UE 24 may use the estimated Doppler shift $\hat{D}$ in various ways. In an example embodiment, the UE comprises a data decoder 76 for decoding the data carried in baseband signal Y(t), which accepts the estimated Doppler shift as input. Decoder 76 uses the estimated Doppler shift value $\hat{D}$ to improve the reliability of data decoding, for example by applying an opposite shift to the frequency of the signal. In some embodiments, decoder 76 additionally uses the SNR estimated by SNR estimator 72 during decoding.

Now we present scheduling considerations regarding the operation of the various elements of processing circuitry 40. In an embodiment, when operating in continuous FDD reception mode, FIFO 48 receives an anchor signal for each received OFDM pilot symbol, i.e., once every 0.25 ms. Similarly, empirical autocorrelation estimator 56 produces an updated empirical autocorrelation vector at the OFDM pilot symbol rate. Since, however, the empirical autocorrelation vectors are expected to change only little over the duration of a single pilot symbol, it is sufficient for processor 40 to execute Doppler shift estimator 64 only once per several pilot symbols, e.g., once every 50 ms.

In an embodiment, when operating in the continuous TDD reception mode, processing circuitry 40 schedules the operation of empirical autocorrelation estimator 56 and Doppler shift estimator 64 similarly to the scheduling described above for the continuous FDD mode. As explained above for the TDD mode, entries of FIFO 48 for which the pilot symbol is missing are zeroed to maintain correct time alignment for the non-zero FIFO entries.

In some embodiments, when operating in TDD mode, following the transmission of an uplink sub-frame, RF front end 36 may add a random phase to the baseband signal, thus creating a phase discontinuity, which may distort the Doppler estimation. In such embodiments, scheduling the operation of empirical autocorrelation estimator 56 and Doppler shift estimator 64 is similar to the TDD mode described above, with the limitation that only anchor signals that were derived from a baseband signal during which no phase change has occurred serve for empirical autocorrelation calculations.

As an example, when the UE is configured to TDD mode with uplink-downlink configuration 1 (2DL+1SP+2UL), wherein DL, SP and UL denote downlink, special and uplink sub-frames, respectively, the duration of the maximal correlation lag that includes contiguous OFDM samples (2DL+1SP) is 3 ms. Alternatively or additionally, the forgetting coefficient α in Equations 3 and 4 is replaced with a forgetting coefficient that depends on the lag time, i.e., $\alpha(\tau)$. For example, to achieve an unbiased estimation of the autocorrelation, $\alpha(\tau)$ can be weighted by a ratio between the number of nonzero samples used for autocorrelation estimation at lag $\tau$ and at the first lag.

In some embodiments, when operating in DRX mode (TDD or FDD), processing circuitry exploits the DRX wake-up intervals for calculating the empirical autocorrelation vectors and for estimating the Doppler shift. Since, however, the actual Doppler shift typically changes at a rate slower than the rate of the OFDM pilot symbols, the processing circuitry schedules to execute Doppler shift estimator 64 once every several wake-up intervals.

In some embodiments, processing circuitry comprises an Automatic Frequency Control (AFC) loop (not shown in FIG. 1), which compensates for frequency drifts in the baseband signal. Correcting the frequency drift by the AFC loop, however, causes the anchor signals to rotate, i.e., to change the phase of the complex values of the anchor signals. In some embodiments, the AFC loop corrects the frequency drifts at the beginning of the DRX wake-up intervals. Processor circuitry 40 schedules the AFC loop to operate in parallel to sub-bands estimator 44 and empirical autocorrelation estimator 56, to fully exploit the DRX wake-up intervals. In an embodiment, sub-bands estimator 44 rotates the anchor signals so as to cancel out the rotation created by the operation of the AFC loop.

Assume now that at some point in time ($T_{AFC}$) the AFC loop corrects the frequency by FC Hz, and let $\tau_{AFC} \geq T_{AFC}$ denote the first time lag after this frequency correction occurs. In an embodiment, the processing circuitry rotates the anchor signals to be stored in FIFOs 48 for time lags in the range $\tau = 0 \ldots \tau_{AFC}-1$, by a time-dependent rotation coefficient $ROT(\tau)$ as depicted in Equation 10.

$$A_{L,RxAnt}Rot(\tau)^* = A_{L,RxAnt}(\tau)^* \cdot ROT(\tau), \tau = 0 \ldots \tau_{AFC}-1$$

$$A_{H,RxAnt}Rot(\tau)^* = A_{H,RxAnt}(\tau)^* \cdot ROT(\tau), \tau = 0 \ldots \tau_{AFC}-1 \quad \text{Equation 10:}$$

wherein the time dependent rotation factor $ROT(\tau)$ is given by:

$$ROT(\tau) = \exp\{i \cdot 2 \cdot \pi \cdot FC \cdot [OS(\tau) - OS(0)] \cdot OS_{duration}\} \quad \text{Equation 11:}$$

In Equation 11 $OS(\tau)$ denotes the index of the received OFDM pilot symbol at time lag $\tau$ (relative to $\tau=0$), and $OS_{duration}$ denotes the interval between pilot symbols.

In an embodiment, processing circuitry 40 rotates anchor signals for time lags in the range $\tau > \tau_{AFC}$ using a fixed rotation coefficient as depicted in Equation 12.

$$A_{L,RxAnt}Rot(\tau)^* = A_{L,RxAnt}(\tau)^* \cdot FIXED\_ROT, \tau \geq \tau_{AFC}$$

$$A_{H,RxAnt}Rot(\tau)^* = A_{H,RxAnt}(\tau)^* \cdot FIXED\_ROT, \tau \geq \tau_{AFC} \quad \text{Equation 12:}$$

wherein the fixed rotation factor $ROT(\tau)$ is given by:

$$FIXED\_ROT = \exp\{i \cdot 2 \cdot \pi \cdot FC \cdot [OS(\tau_{AFC}-1) - OS(0)] \cdot OS_{duration}\} \quad \text{Equation 13:}$$

Note that in Equations 11 and 13 above, the frequency correction term FC may not be available when calculating the anchor signals, and therefore processing circuitry 40 stores the anchor signals to be rotated until the AFC loop provides the value of FC, in an embodiment.

In some embodiments, instead of calculating the anchor signals as given in Equations 1 and 2 above and then rotating the anchor signals, e.g., as given in Equations 10-13, prior to storing in FIFOs 48, empirical autocorrelation estimator 56 applies the rotation operation on the fly. In these embodiments, for $\tau = 0 \ldots \tau_{AFC}-1$ $A_{H,RxAnt}(\tau)^*$ in Equation 3 is replaced with $A_{H,RxAnt}(\tau)^* \cdot ROT(\tau)$ and $A_{L,RxAnt}(\tau)^*$ in Equation 4 is replaced with $A_{L,RxAnt}(\tau)^* \cdot ROT(\tau)$. Similarly for $\tau \geq \tau_{AFC}$, $A_{H,RxAnt}(\tau)^*$ in Equation 3 is replaced with $A_{H,RxAnt}(\tau)^* \cdot FIXED\_ROT$ and $A_{L,RxAnt}(\tau)^*$ in Equation 4 is replaced with $A_{L,RxAnt}(\tau)^* \cdot FIXED\_ROT$.

As described above, the calculation of the empirical autocorrelation vectors in Equations 3 and 4 is based on IIR filtering with a forgetting coefficient $\alpha$. The effective memory of IIR filters typically reduces for higher values of $\alpha$. When operating in a continuous mode, in which the OFMD symbol rate is about one symbol per 0.25 ms, a forgetting coefficient $\alpha = 0.002$ results in IIR effective memory of 150 ms, which is suitable for estimating the Doppler shift, which typically changes significantly over periods of a few seconds.

When operating in DRX mode, the effective memory is typically much longer than in continuous mode. For example, assuming that the processing circuitry calculates a single autocorrelation outcome per DRX wake-up interval of 2.5 seconds, a forgetting coefficient $\alpha = 0.1$ results in about 30 seconds of effective memory. In some embodiments, empirical autocorrelation estimator 56 calculate m autocorrelation outcomes per a DRX wake-up interval so as to reduce the effective memory of the IIR filter by a factor of m.

The UE and processing circuitry configurations shown in FIG. 1 are simplified example configurations, which are depicted solely for the sake of clarity. In alternative embodiments, any other suitable configuration can also be used. Some UE elements that are not mandatory for understanding of the disclosed techniques have been omitted from the figure for the sake of clarity. The different elements of the UE and processing circuitry may be implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements.

In some embodiments, some or all of the elements of given UE and processing circuitry, are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

As an example, although in FIG. 1 the baseband signal from which the Doppler shift is estimated is derived from two antennas (using two respective front end receivers), in alternative embodiments, the baseband signal may originate from only one antenna, or from a number of antennas larger than two.

As another example, the processing flow in processing circuitry 40 occurs in two parallel paths, corresponding to the high and low anchor signals derived by sub-bands estimator 44. In alternative embodiments, however, the processing flow may comprise any other number of anchor signals, such as, for example, a single anchor signal, or more than two anchor signals.

Figure 2:
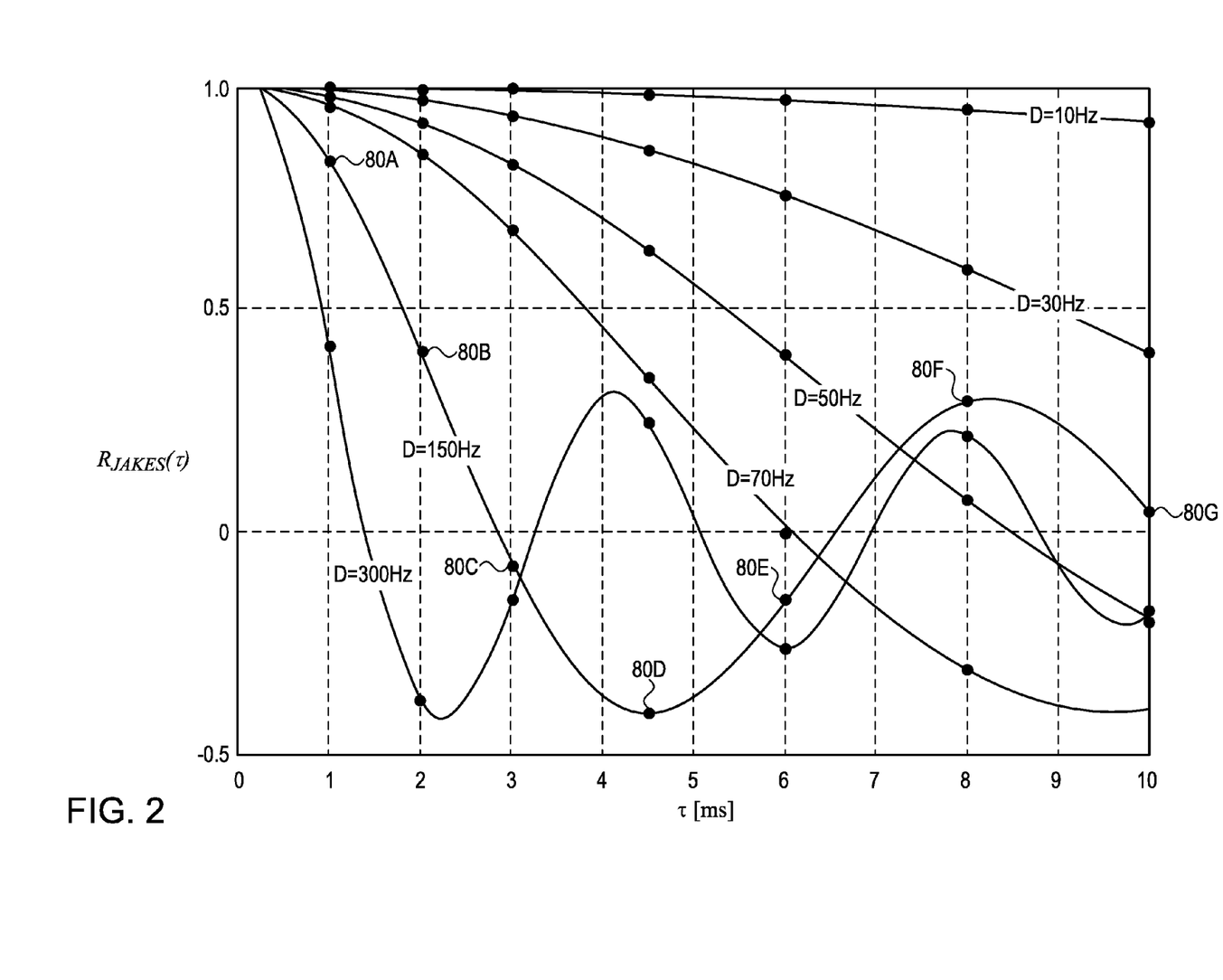
FIG. 2 is a diagram depicting several autocorrelation vectors, each corresponding to a different Doppler shift, in accordance with an embodiment that is described herein.

FIG. 2 is a diagram depicting several autocorrelation vectors, each corresponding to a different Doppler shift value, in accordance with an embodiment that is described herein. The autocorrelation vectors in the figure serve, for example as predefined autocorrelation vectors $V_D(\tau)$ 68 of FIG. 1 above.

In the figure, each autocorrelation vector comprises multiple elements or samples 80 drawn from a continuous autocorrelation function, which is related to a given Doppler shift value. In the example of FIG. 2, the continuous autocorrelation functions are based on the Jakes' fading model, which will be described below. In the present example, the continuous autocorrelation functions and respective autocorrelation vectors correspond to Doppler shift values of 10 Hz, 30 Hz, 50 Hz, 70 Hz, 150 Hz and 300 Hz. Alternatively, other Doppler values can also be used.

Vector elements 80 correspond to multiple respective time lags. For example, the autocorrelation vector that corresponds to a Doppler shift of 150 Hz comprises autocorrelation values 80A, 80B, 80C, 80D, 80E, 80F and 80G, corresponding to respective time lags 1 ms, 2 ms, 3 ms, 4.5 ms, 6 ms, 8 ms and 10 ms.

According to the Jakes' fading model, the autocorrelation for a Doppler shift value D and a time lag $\tau$ is given by:

$$r_{Jakes'}(\tau, D) = J_0(2\pi \cdot D \cdot \tau) \quad \text{Equation 14}$$

In Equation 14, $J_0(\cdot)$ denotes the Bessel function of order zero.

The continuous autocorrelation functions depicted in FIG. 2 correspond to a normalized version of Equation 14 as follows:

$$R_{Jakes'}(\tau, D) = \frac{J_0(2\pi \cdot D \cdot \tau)}{J_0(2\pi \cdot D \cdot 0.00025)} \quad \text{Equation 15}$$

The normalization factor in Equation 15 corresponds to the second time lag index, for which $\tau=0.00025$ ms, or equivalently to about four OFDM pilot symbols in normal Cyclic Prefix (CP) mode, and three OFDM pilot symbols in extended CP mode.

The configuration of autocorrelation vectors $V_D(\tau)$ 68 in FIG. 2 is provided by way of example and any other suitable autocorrelation vectors configurations can also be used. For example, the autocorrelation vectors can be derived from models other than the Jakes' fading model. As another example the autocorrelation vectors can be defined for other Doppler shift values, other time lags, or both. As yet another example, different embodiments can use a different number of predefined autocorrelation vectors, depending for example, on the required precision of the Doppler shift estimation.

Figure 3:
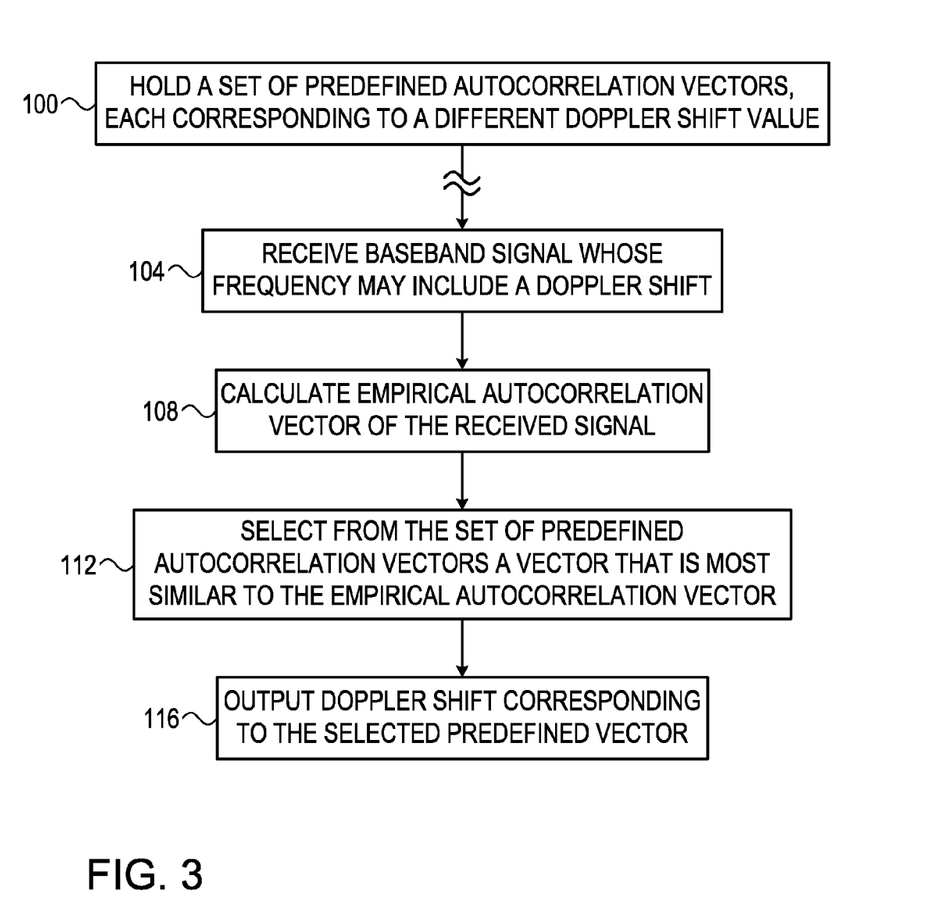
FIG. 3 is a flow chart that schematically illustrates a method for estimating a Doppler shift using predefined autocorrelation vectors, in accordance with an embodiment that is described herein.

FIG. 3 is a flow chart that schematically illustrates a method for estimating a Doppler shift using predefined autocorrelation vectors $V_D(\tau)$ 68, in accordance with an embodiment that is described herein. The method begins with processing circuitry 40 holding a set of predefined autocorrelation vectors $V_D(\tau)$ 68, each corresponding to a different Doppler shift value D in a predefined set of Doppler shift values D1 ... DN. In some embodiments, the predefined autocorrelation vectors $V_{D1} ... V_{DN}$ are derived offline based on the Jakes' fading model as described in FIG. 2 above.

At a reception operation 104, processing circuitry receives from front end units 36 a baseband signal whose frequency may include a Doppler shift, e.g., created by a movement of UE 24 relative to its serving BS 28. The value of the Doppler shift is typically a-priori unknown to the processing circuitry or to any other component of the UE. Further at operation 104, sub-bands estimator 44 produces high and low anchor signals, using any suitable method, such as, for example, as given in Equations 1 and 2 above, and stores the anchor signals in FIFO units 48.

At an autocorrelation calculation operation 108, empirical autocorrelation estimators 56 derive normalized autocorrelation vectors from the anchor signals, using for example Equations 3-6 above. At a decision operation 112, Doppler shift estimator 64 first calculates N metrics M(D1) ... M(DN), wherein each metric measures the similarity or matching level between the normalized autocorrelation vectors derived at operation 108, and a respective predefined autocorrelation vector among $V_{D1} ... V_{DN}$. Doppler shift estimator 64 then selects the Doppler shift value $\hat{D}$ among D1 ... DN for which $M(\hat{D})$ is minimal.

At an output operation 116, Doppler shift estimator 64 outputs the estimated Doppler shift value $\hat{D}$ to be used, for example, for improving the reliability of data decoding from the received baseband signal in data decoder 76. Following operation 116, the method terminates.

The various disclosed techniques for estimating a Doppler shift are provided by way of example, and other techniques can also be used. For example, although the techniques mainly refer to estimating empirical autocorrelation vectors from an OFDM signal comprises multiple subcarrier frequencies, similar techniques can be used for a single carrier signal.

Although the embodiments described herein mainly address estimating Doppler shift in a LTE system, the methods and systems described herein can also be used in other applications, such as in any other system (e.g., other mobile communication systems) that require estimating a Doppler shift.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a communication terminal, holding in a memory multiple predefined vectors, each comprising signal autocorrelation values computed for a respective Doppler shift;
   receiving a signal, and calculating empirical autocorrelation values for the received signal; and
   estimating an actual Doppler shift of the received signal by selecting, from among the predefined vectors, a vector whose autocorrelation values best match the empirical autocorrelation values of the received signal.

2. The method according to claim 1, wherein receiving the signal comprises receiving an Orthogonal Frequency-Division Multiplexing (OFDM) signal that is transmitted in multiple time-frequency bins, and wherein calculating the empirical autocorrelation values comprises deriving frequency averages of the received signal, each frequency average computed over time-frequency bins of a respective time index, and calculating the empirical autocorrelation values using the frequency averages.

3. The method according to claim 2, wherein the time-frequency bins span a given frequency band, wherein deriving the frequency averages comprises dividing the frequency band into two or more frequency sub-bands, and calculating the frequency averages separately for each of the frequency sub-bands, and wherein estimating the Doppler shift comprises selecting the vector based on the frequency averages calculated over the frequency sub-bands.

4. The method according to claim 1, wherein calculating the empirical autocorrelation values comprises normalizing the empirical autocorrelation values by a factor that corresponds to an empirical autocorrelation value of a non-zero time lag.

5. The method according to claim 1, wherein calculating the empirical autocorrelation values comprises calculating the empirical autocorrelation values over multiple different time segments corresponding to Orthogonal Frequency-Division Multiplexing (OFDM) symbols that the received signal bears, and smoothing the empirical autocorrelation values, per time lag, over the multiple time segments.

6. The method according to claim 5, wherein smoothing the empirical autocorrelation values comprises filtering the empirical autocorrelation values of a given time lag using a first-order low-pass Infinite Impulse Response (IIR) filter.

7. The method according to claim 6, wherein filtering the empirical autocorrelation values comprises specifying the IIR filter with a forgetting coefficient that depends on a continuous or Discontinuous Reception (DRX) mode of the communication terminal, and on the given time lag.

8. The method according to claim 1, wherein calculating the empirical autocorrelation values comprises rotating the empirical autocorrelation values based on a frequency correction indication from an Automatic Frequency Control (AFC) loop of the communication terminal.

9. The method according to claim 1, wherein each of the predefined vectors comprises multiple samples of an autocorrelation function, according to a Jakes' fading model.

10. The method according to claim 1, wherein selecting the vector comprises choosing the vector whose autocorrelation values minimize a similarity metric with respect to the empirical autocorrelation values of the received signal.

11. The method according to claim 10, wherein the similarity metric comprises a mean squares difference metric.

12. The method according to claim 1, wherein selecting the vector comprises calculating similarity metrics between the predefined vectors and the empirical autocorrelation values of the received signal, while excluding at least zero-time-lag autocorrelation values.

13. The method according to claim 1, wherein estimating the actual Doppler shift comprises using a first number of the predefined vectors when operating in a Time-Division Duplex (TDD) mode, and a second number of the predefined vectors, larger than the first number, when operating in a Frequency-Division Duplex (FDD) mode.

14. Apparatus, comprising:
a receiver, which is configured to receive a signal; and
processing circuitry, which is configured to hold in a memory multiple predefined vectors, each comprising signal autocorrelation values computed for a respective Doppler shift, to calculate empirical autocorrelation values for the received signal, and to estimate an actual Doppler shift of the received signal by selecting, from among the predefined vectors, a vector whose autocorrelation values best match the empirical autocorrelation values of the received signal.

15. The apparatus according to claim 14, the processing circuitry is configured to receive an Orthogonal Frequency-Division Multiplexing (OFDM) signal that is transmitted in multiple time-frequency bins, and to calculate the empirical autocorrelation values by deriving frequency averages of the received signal, each frequency average computed over time-frequency bins of a respective time index, and calculating the empirical autocorrelation values using the frequency averages.

16. The apparatus according to claim 15, wherein the time-frequency bins span a given frequency band, wherein the processing circuitry is configured to divide the frequency band into two or more frequency sub-bands, to calculate the frequency averages separately for each of the frequency sub-bands, and to select the vector based on the frequency averages calculated over the frequency sub-bands.

17. The apparatus according to claim 14, wherein the processing circuitry is configured to rotate the empirical autocorrelation values based on a frequency correction indication from an Automatic Frequency Control (AFC) loop of the communication terminal.

18. The apparatus according to claim 14, wherein the processing circuitry is configured to choose the vector whose autocorrelation values minimize a similarity metric with respect to the empirical autocorrelation values of the received signal.

19. A mobile communication terminal comprising the apparatus of claim 14.

20. A chipset for processing signals in a mobile communication terminal, comprising the apparatus of claim 14.

* * * * *